US009758090B1

(12) United States Patent
Salter et al.

(10) Patent No.: US 9,758,090 B1
(45) Date of Patent: Sep. 12, 2017

(54) INTERIOR SIDE MARKER

(71) Applicant: Ford Global Technologies, LLC, Dearborn, MI (US)

(72) Inventors: Stuart C. Salter, White Lake, MI (US); Paul Kenneth Dellock, Northville, MI (US); Michael A. Musleh, Canton, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/449,267

(22) Filed: Mar. 3, 2017

(51) Int. Cl.
| *B60Q 1/00* | (2006.01) |
| *B60Q 1/26* | (2006.01) |
| *B60Q 1/32* | (2006.01) |
| *B60R 1/06* | (2006.01) |
| *B60R 1/12* | (2006.01) |
| *B60Q 1/24* | (2006.01) |
| *B60Q 3/217* | (2017.01) |
| *B60Q 3/233* | (2017.01) |

(52) U.S. Cl.
CPC ............... *B60Q 1/323* (2013.01); *B60Q 1/24* (2013.01); *B60Q 1/2696* (2013.01); *B60Q 3/217* (2017.02); *B60Q 3/233* (2017.02); *B60R 1/06* (2013.01); *B60R 1/1207* (2013.01); *B60Q 2400/40* (2013.01)

(58) Field of Classification Search
CPC ........ B60Q 1/24; B60Q 1/2696; B60Q 1/323; B60Q 3/217; B60Q 3/233; B60R 1/04; B60R 1/06; B60R 1/1207

USPC .................................. 362/487-488, 509-510
See application file for complete search history.

(56) References Cited

U.S. PATENT DOCUMENTS

| 2,486,859 | A | 11/1949 | Meijer et al. |
| 5,053,930 | A | 10/1991 | Benavides |
| 5,206,562 | A | 4/1993 | Matsuno et al. |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,561,684 | B2 | 5/2003 | Reitze et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle includes a seat assembly having a seatback and a seat base. A side marker is positioned on the seat base. A light assembly is configured to emit light toward the side marker. The side marker emits light to an exterior of the vehicle when the vehicle is in a doors off configuration.

19 Claims, 11 Drawing Sheets

(56) References Cited

U.S. PATENT DOCUMENTS

| | | |
|---|---|---|
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,293,831 B2 | 11/2007 | Greene |
| 7,304,255 B1 | 12/2007 | Pratt |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0090767 A1 | 5/2004 | Hou |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| CN | 205523986 | 8/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | H9328038 A | 6/1991 |
| JP | 2000159011 A | 6/2000 |
| JP | 2007238063 A | 9/2007 |
| JP | 4363392 B2 | 8/2009 |
| KR | 20060026531 A | 3/2006 |
| WO | 2006047306 A1 | 5/2006 |
| WO | 2014068440 A1 | 5/2014 |

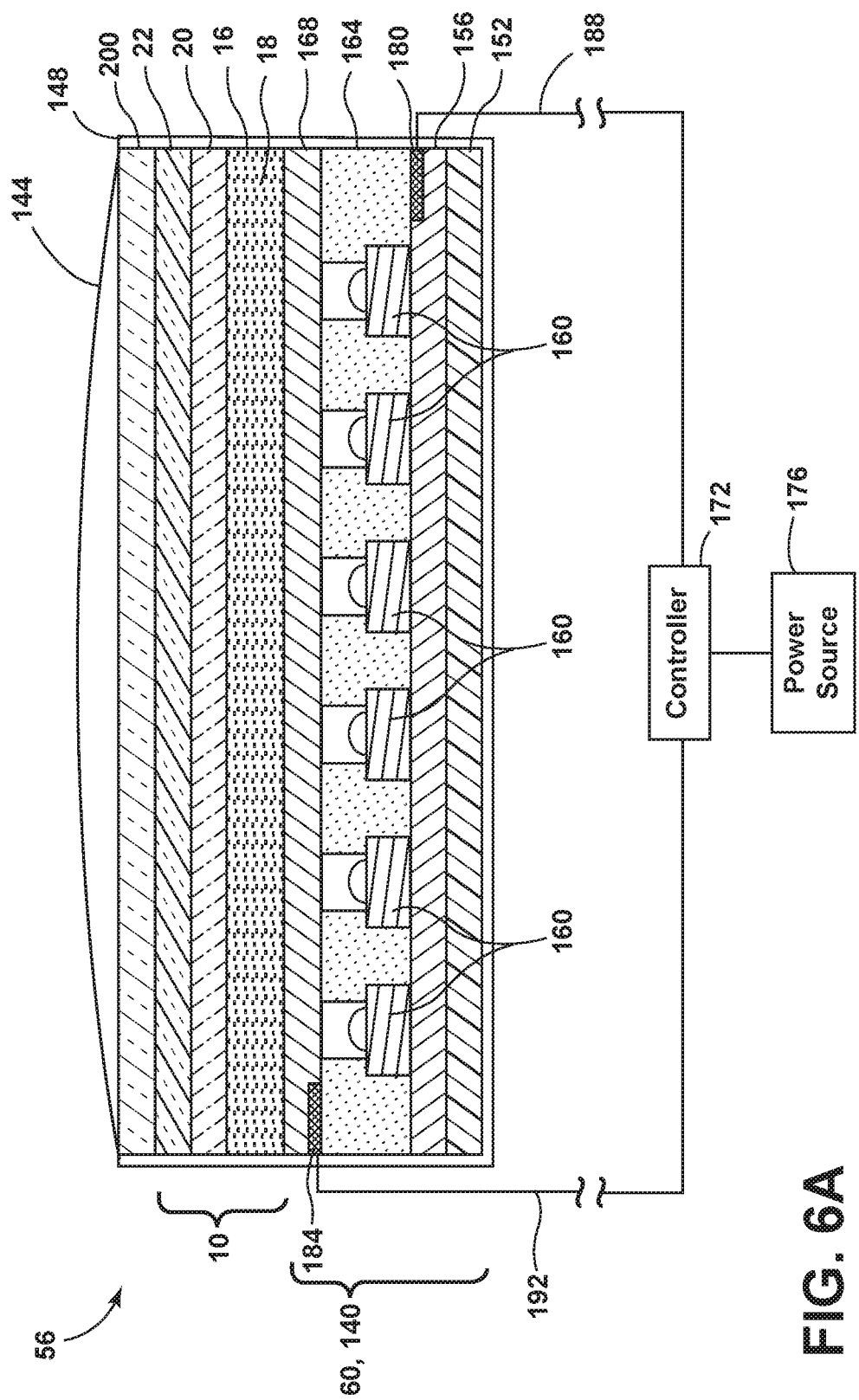

INTERIOR SIDE MARKER

FIELD OF THE INVENTION

The present disclosure generally relates to vehicle side markers, and more particularly, to illuminated side markers.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle includes a seat assembly having a seatback and a seat base. A side marker is positioned on the seat base. A light assembly is configured to emit light toward the side marker. The side marker emits light to an exterior of the vehicle when the vehicle is in a doors off configuration.

According to another aspect of the present disclosure, a vehicle includes a seat assembly having a seatback and a seat base. A side marker is positioned on the seat base including a light assembly. A photoluminescent structure is positioned on the light assembly. The photoluminescent structure is configured to emit light into a foot well of the vehicle.

According to yet another aspect of the present disclosure, a method of operating a vehicle, including the steps: removing a door of a vehicle such that the vehicle is in a doors off configuration; charging a photoluminescent structure within a side marker positioned on a seat assembly; and emitting light from the side marker toward an exterior of the vehicle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 6A is a cross-sectional view taken along line VI-VIA of FIG. 5 illustrating a light assembly according to one embodiment;

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
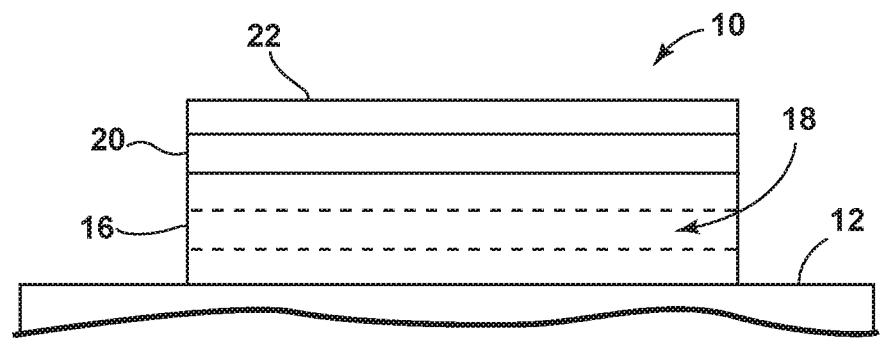
FIG. 1A is a side view of a photoluminescent structure rendered as a coating for use in an assembly according to one embodiment.
Figure 1B:
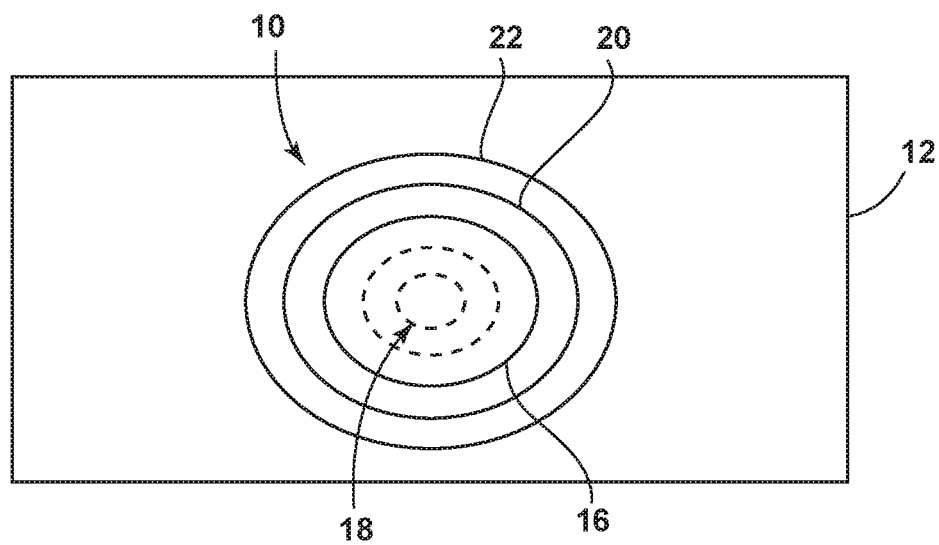
FIG. 1B is a top view of a photoluminescent structure rendered as a discrete particle according to one embodiment.
Figure 1C:
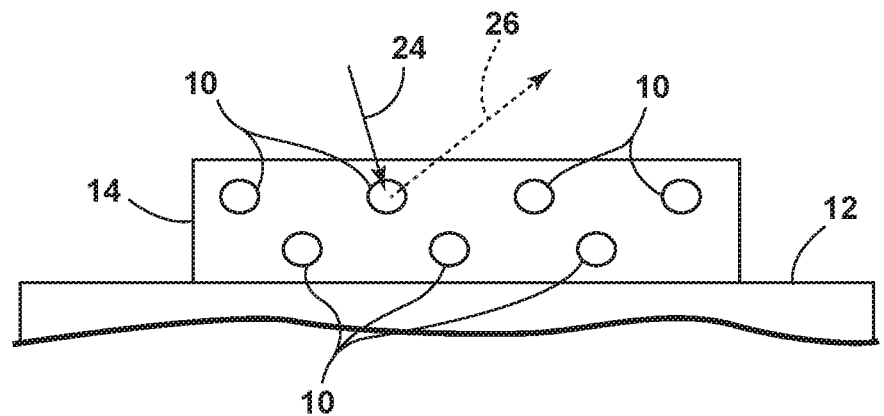
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from 4D' to 4f as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2A-7, reference numeral 40 generally designates a vehicle. The vehicle 40 includes a seat assembly 44 including a seatback 48 and a seat base 52. A side marker 56 is positioned on the seat base 52. A light assembly 60 is configured to emit light toward the side marker 56. The side marker 56 emits light to an exterior of the vehicle 40 when the vehicle 40 is in a doors off configuration.

Figure 2A:
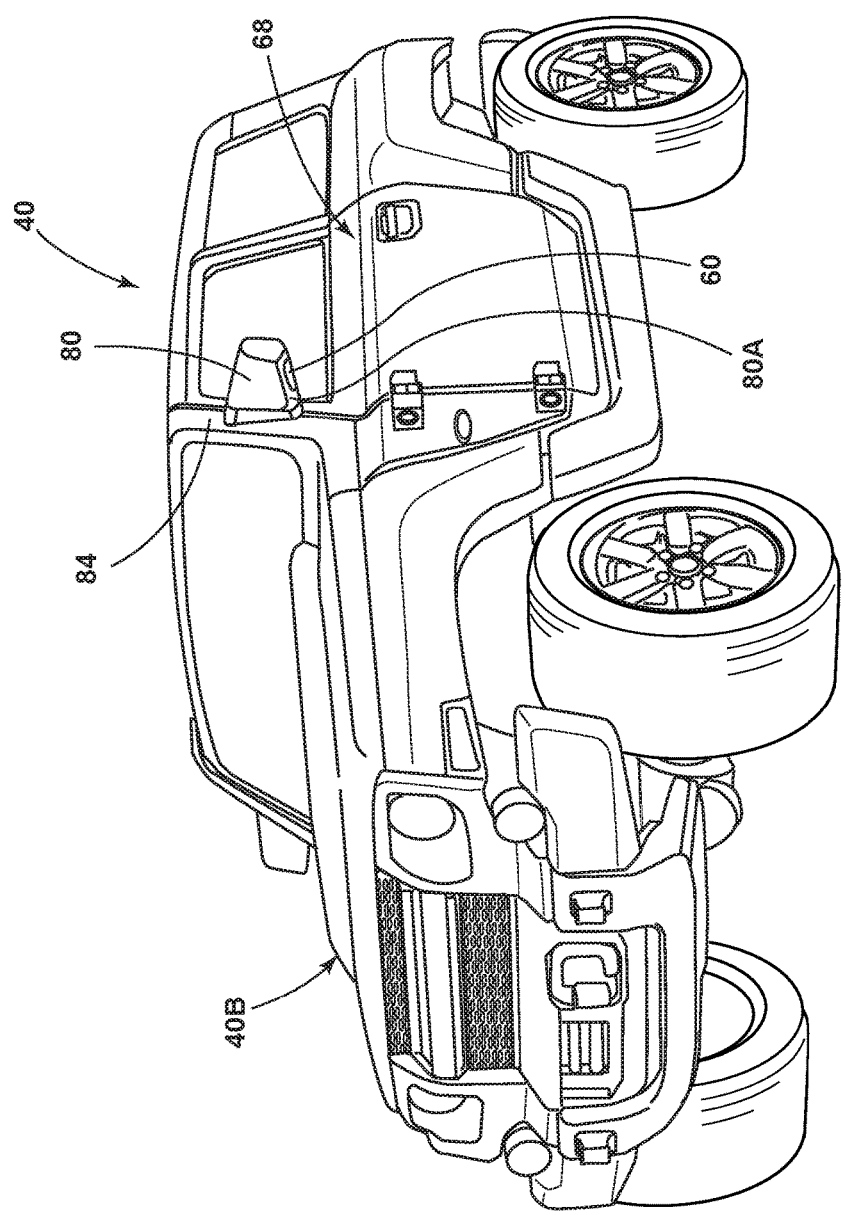
FIG. 2A is a side perspective view of a vehicle in a "doors on" configuration, according to at least one example.
Figure 2B:
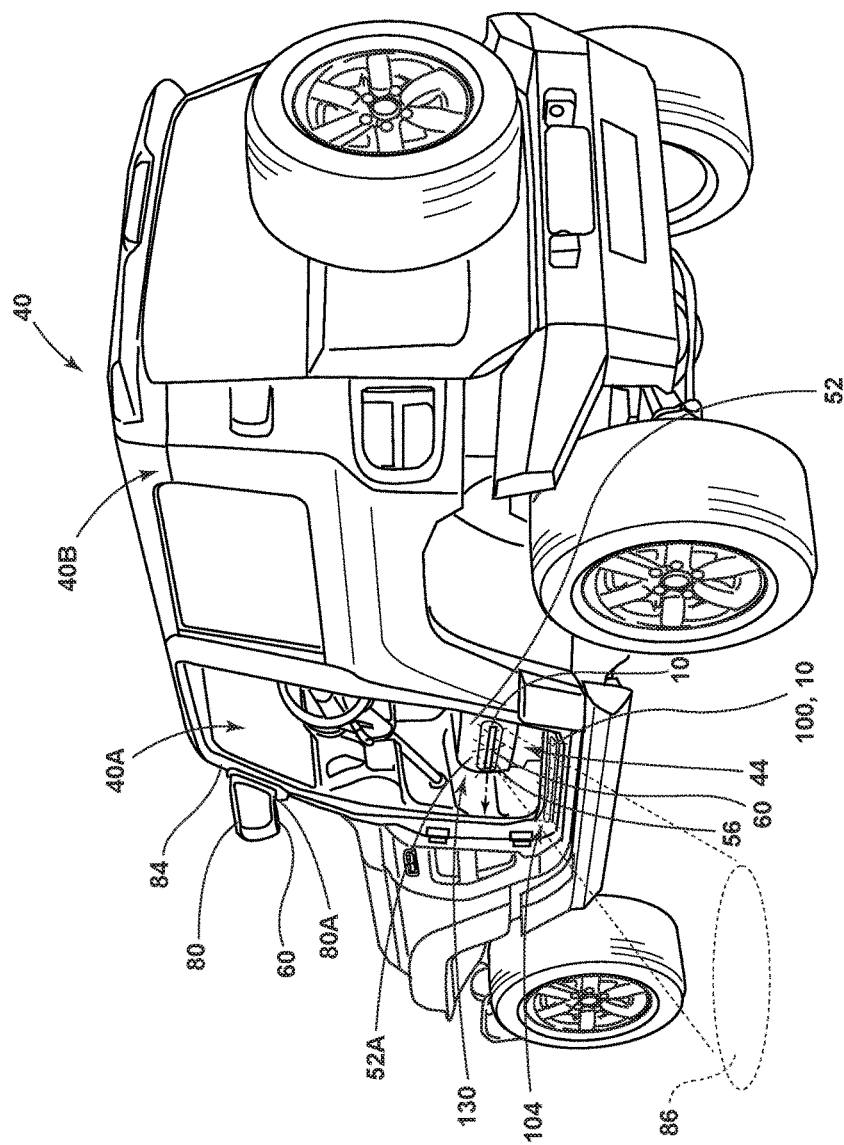
FIG. 2B is a side perspective view of a vehicle in a "doors off" configuration, according to at least one example.
Figure 5:
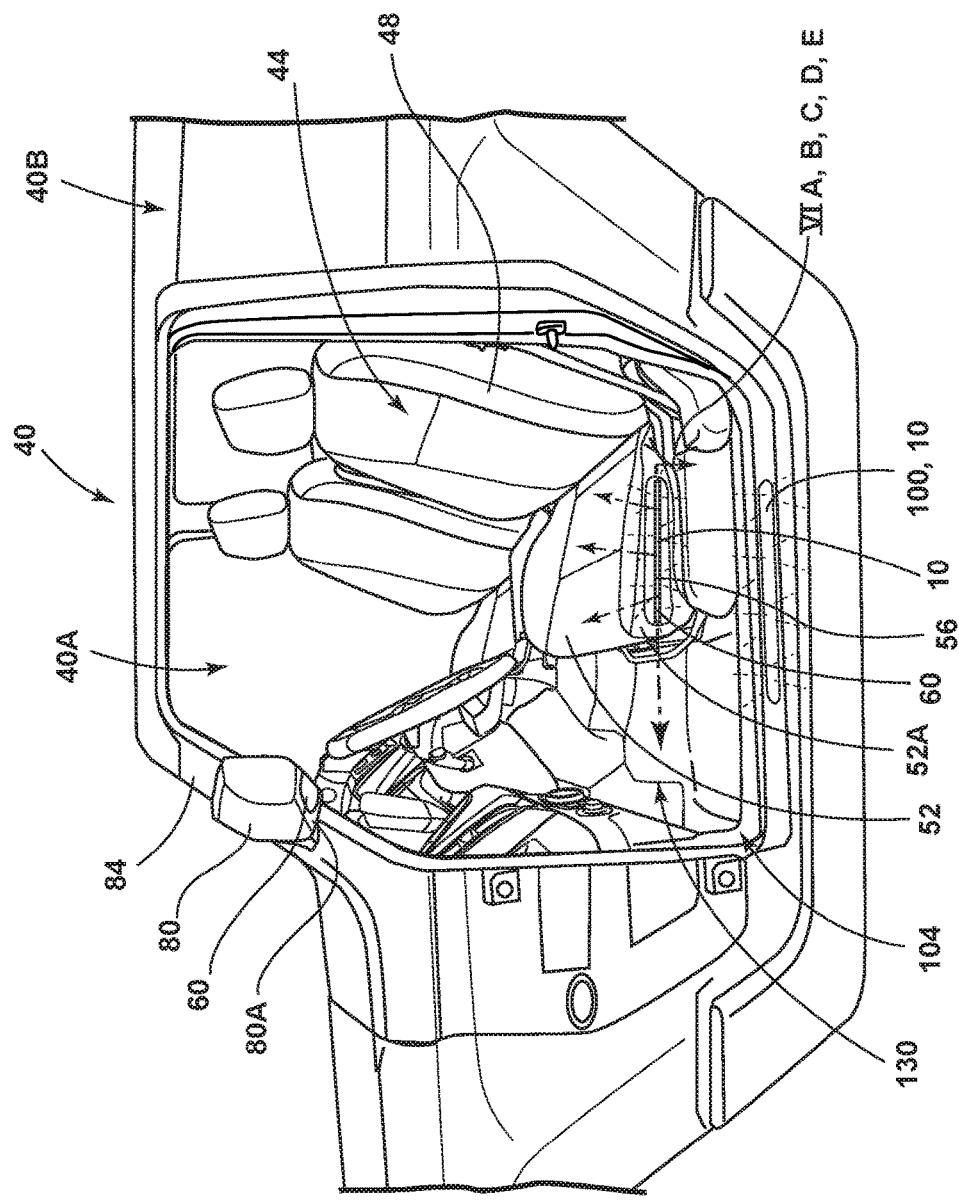
FIG. 5 is a side perspective view of a vehicle in a doors off configuration, according to at least one example.

Referring now to FIGS. 2A and 2B, the vehicle 40 is capable of operation in a "doors on" configuration (FIGS. 2A and 3) and a "doors off" configuration (FIGS. 2B and 5). In the doors on configuration, the vehicle 40 includes a plurality of doors 68 (e.g., driver and passenger doors) positioned around the vehicle 40 enclosing an interior 40A, or passenger cabin, of the vehicle 40. The doors 68 are operable between a closed position (FIG. 2A) and an open position. In essence, the vehicle 40 may be operated in a doors on configuration with the doors 68 attached to a frame of the vehicle 40. In the doors off configuration, one or more of the doors 68 may be removed prior to operation (e.g., driving) of the vehicle 40 such that increased ventilation and/or a desired aesthetic appeal of the vehicle 40 is achieved. It will be understood that although shown in relation to a front passenger portion of the vehicle 40, the disclosure provided below may equally be applied to a rear passenger portion of the vehicle 40 as well as a driver side of the vehicle 40.

The seat assembly 44 may be positioned within the interior 40A of the vehicle 40. The seat assembly 44 includes the seatback 48 and the seat base 52. According to various examples, the seatback 48 may be operably coupled with the seat base 52 and configured to pivot relative to the seat base 52. The seat assembly 44 may be a single, or bucket, seat or may be a multi-person, or bench, seat. In bench seat examples, the seat assembly 44 may include a plurality of seatbacks 48 and a single seat base 52. The seat base 52 may define an outboard surface 52A proximate the doors 68 of the vehicle 40. For purposes of this disclosure, the term outboard may mean outward, or away from a center of the vehicle 40 while the term inboard may mean toward, or proximate a center of the vehicle 40.

A side mirror 80 may be positioned on an "A-" pillar 84 of the vehicle 40. In the depicted example, the side mirror 80 is coupled, or positioned, proximate a center of the A-pillar 84, but it will be understood that the side mirror 80 may be coupled toward a base or a top of the A-pillar 84. According to various examples, the side mirror 80 may be pivotable (e.g., to adjust viewing and/or light emission patterns) relative to the A-pillar 84. In examples where the side mirror 80 is coupled to the A-pillar 84, the side mirror 80 may not be coupled to the door 68. As such, the side mirror 80 may not move when the door 68 is transitioned between the open and closed positions. Further, when the vehicle 40 is in the doors off configuration, the side mirror 80 remains coupled with the vehicle 40.

The light assembly 60 may be coupled to, or positioned, in a variety of locations around the vehicle 40. For example, the light assembly 60 may be coupled to the side mirror 80 and/or be included in, or positioned proximate, the side marker 56. In examples where the light assembly 60 is positioned on the side mirror 80, the light assembly 60 may remain operable, and coupled with the vehicle 40, in both the doors on and doors off configurations of the vehicle 40. In the depicted example, the light assembly 60 is coupled with a bottom surface 80A of the side mirror 80, but it will be understood that the light assembly 60 may be positioned on a top and/or sides (e.g., vehicle forward, inboard, outboard and/or vehicle rearward) of the side mirror 80 without departing from the teachings provided herein. Regardless of position, the light assembly 60 may include a plurality of light sources. The light sources may be configured to emit visible (e.g., white and/or colored) light, as well as non-visible light (e.g., infrared, near-infrared, ultraviolet and/or the excitation light 24). The light sources may be light-emitting diodes, incandescent bulbs, electroluminescent devices and/or other types of devices capable of emitting electromagnetic radiation. The light assembly 60 may include a single light source or a plurality of light sources. For example, the light assembly 60 may include between 1 and about 10 light sources. In a specific example, the light assembly 60 may include 6 light sources. Each of the light sources may illuminate or excite a different region (e.g., photoluminescent structure 10, or area) of the vehicle 40. As such, each of the light sources may be configured to emit a different color or wavelength band of light based on the location it illuminates. The light sources of the light assembly 60 may emit light into the interior 40A of the vehicle 40 as well as on to an exterior 40B of the vehicle 40. As will be explained in greater detail below, the light assembly 60 may illuminate the side marker 56 remotely (e.g., from the side mirror 80) and/or from a rear (e.g., when the light assembly 60 is part of and/or positioned behind the interior side marker 56). For purposes of this disclosure, to illuminate may mean to provide the excitation light 24, visible and/or non-visible light to a region or area of the vehicle 40.

The interior side marker 56 is positioned on the seat assembly 44. In the depicted example, the interior side marker 56 is positioned on the seat base 52, but it will be understood that the interior side marker 56 may additionally or alternatively be positioned on the seatback 48. The interior side marker 56 is positioned on the outboard surface 52A of the seat base 52. In the depicted example, the interior side marker 56 is shown as extending across the outboard surface 52A of the seat base 52, but it will be understood that the interior side marker 56 may extend across only a portion of the outboard surface 52A. The interior side marker 56 may be positioned at a bottom, middle or top of the seat base 52, or any location therebetween. It will be understood that multiple seat assemblies 44 within the vehicle 40 may include the interior side marker 56 without departing from the teachings provided herein. For example, seat assemblies 44 positioned in a rear of the vehicle 40 may also include the interior side marker 56. The interior side marker 56 is depicted as a single, unitary, structure, but it will be understood that the marker 56 may be composed of a plurality of smaller markers, each of the same, or varying, size. Further, the vehicle 40 and/or seat base 52 may include a plurality of interior side markers 56. According to at least one example, the interior side marker 56 may be painted onto, or incorporated into an upholstery of, the outboard surface 52A of the seat base 52. According to yet other examples, the interior side marker 56 may be part of a sticker which is adhered to the outboard surface 52A of the seat base 52.

According to various examples, the interior side marker 56 may include the photoluminescent structure 10. As such, illumination of the interior side marker 56 by the light assembly 60 may excite the marker 56 into emitting visible light. The illumination by the light assembly 60 may further function to charge (e.g., in persistent phosphor examples) the interior side marker 56 such that the marker 56 emits light over a sustained period of time without constant and/or continual illumination by the light assembly 60. It will be understood that the interior side marker 56 may further be charged, or caused to emit light, from ambient lighting (e.g., the sun, moon, street lamps, etc.) and/or illumination (e.g., head lights) from other vehicles. Further, the interior side marker 56 may be charged while the door 68 is in either the open or closed positions (e.g., via examples where the light assembly 60 is incorporated or proximate to the side marker 56) and even while the door 68 is removed from the vehicle 40 (e.g., via examples where the light assembly 60 is incorporated in the side mirror 80). The interior side marker 56 may include one or a plurality of reflective elements which may reflect visible and/or nonvisible light which may increase visibility of the vehicle 40.

The interior side marker 56 is configured to emit light outwardly and away from the vehicle 40. The light emitted from the interior side marker 56 may be a variety of colors based on the charging or excitation light 24 received from the light assembly 60. For example, the interior side marker 56 may be configured to glow, or emit, amber colored light while the vehicle 40 is in motion (e.g., driving). In another example, the interior side marker 56 may be configured to emit white or colored light while the vehicle 40 is not in motion (e.g., parked). Further, the light emitted from the interior side marker 56 may take a variety of other colors which may provide an aesthetically pleasing appearance to the vehicle 40 (e.g., based on predefined user preferences or color schemes of the vehicle 40). According to various examples, the interior side marker 56 may be configured to emitting a puddle lamp 86 onto a ground beneath the vehicle 40. The puddle lamp 86 may have the same or a different color as the light emitted from the interior side marker 56.

Use of the interior side marker 56 may be advantageous in increasing a visibility of the vehicle 40 while the vehicle 40 is in the door off configuration. For example, with the doors 68 removed from the vehicle 40, the interior side marker 56 is visible to other vehicles and designates a side of the vehicle 40. Further, incorporation of one or more reflective elements into the interior side marker 56 may provide a passive illumination which may increase the visibility of the vehicle 40. Even further, the interior side marker 56 may emit light while the door 68 is coupled to the vehicle 40 and in the closed position such that marker 56 provides an aesthetically pleasing ambient light to the interior 40A of the vehicle 40. In other words, the interior side marker 56 may be configured to reflect light off of an interior surface 68B (FIG. 3) of the door 68 to provide ambient lighting to the interior 40A of the vehicle 40.

According to various examples, an auxiliary side marker 100 may be positioned on the vehicle 40. The auxiliary side marker 100 is positioned on a door sill 104 of the vehicle 40. In the depicted example, the auxiliary side marker 100 is positioned along a bottom portion of the door sill 104, but it will be understood that the auxiliary side marker 100 may additionally or alternatively extend around a majority or an entirety of the door sill 104. In examples where only a portion of the door sill 104 is covered by the auxiliary side marker 100, the auxiliary side marker 100 may be positioned on the bottom, sides or top of the door sill 104 or any location therebetween. It will be understood that the auxiliary side marker 100 may be positioned on any door sill 104 defined by the vehicle 40. The auxiliary side marker 100 is depicted as a single, unitary, structure, but it will be understood that the marker 100 may be composed of a plurality of smaller markers, each of the same, or varying, size. Further, the vehicle 40 and/or door sill 104 may include a plurality of auxiliary side markers 100. According to at least one example, the auxiliary side marker 100 may be painted onto the door sill 104. According to yet other examples, the auxiliary side marker 100 may be part of a sticker which is adhered to the door sill 104.

According to various examples, the auxiliary side marker 100 may include the photoluminescent structure 10. As such, illumination of the auxiliary side marker 100 by the light assembly 60 may excite the marker 100 into emitting visible light. The illumination by the light assembly 60 may further function to charge (e.g., in persistent phosphor examples) the auxiliary side marker 100 such that the marker 100 emits light over a sustained period of time without constant and/or continual illumination by the light assembly 60. It will be understood that the auxiliary side marker 100 may further be charged, or caused to emit light, from ambient lighting (e.g., the sun, moon, street lamps, etc.), illumination (e.g., head lights) from other vehicles and/or from the interior side marker 56. In other words, the side marker 56 may be configured to emit light onto the auxiliary side marker 100. Further, the auxiliary side marker 100 may be charged while the door 68 is in the open position and when the door 68 is removed from the vehicle 40. The auxiliary side marker 100 may include one or a plurality of reflective elements which may reflect visible and/or nonvisible light which may increase visibility of the vehicle 40.

The auxiliary side marker 100 is configured to emit light outwardly and away from the vehicle 40. In examples where the auxiliary side marker 100 covers a majority and/or an entirety of the door sill 104, lighting from the auxiliary side marker 100 may outline the door sill 104. The light emitted from the auxiliary side marker 100 may be a variety of colors based on the charging or excitation light 24 it receives. For example, the auxiliary side marker 100 may be configured to glow, or emit, amber colored light while the vehicle 40 is in motion (e.g., driving). In another example, the auxiliary side marker 104 may be configured to emit white or colored light while the vehicle 40 is not in motion (e.g., parked). Further, the light emitted from the auxiliary side marker 100 may take a variety of other colors which may provide an aesthetically pleasing appearance to the vehicle 40 (e.g., based on predefined user preferences or color schemes of the vehicle 40).

Use of the auxiliary side marker 100 may be advantageous in increasing a visibility of the vehicle 40 while the vehicle 40 is in the door off configuration and/or while the door 68 is in the open position. For example, when the auxiliary side marker 100 is exposed (e.g., doors off or the door 68 is in the open position) the auxiliary side marker 100 is visible to other vehicles and designates a side of the vehicle 40. Illumination of the auxiliary side marker 100 may not only cause the marker 100 to immediately emit light, but may also charge the marker 100 to sustain a desired luminance for an extended period of time. Further, incorporation of one or more reflective elements into the auxiliary side marker 100 may provide a passive illumination which may increase the visibility of the vehicle 40.

Figure 3:
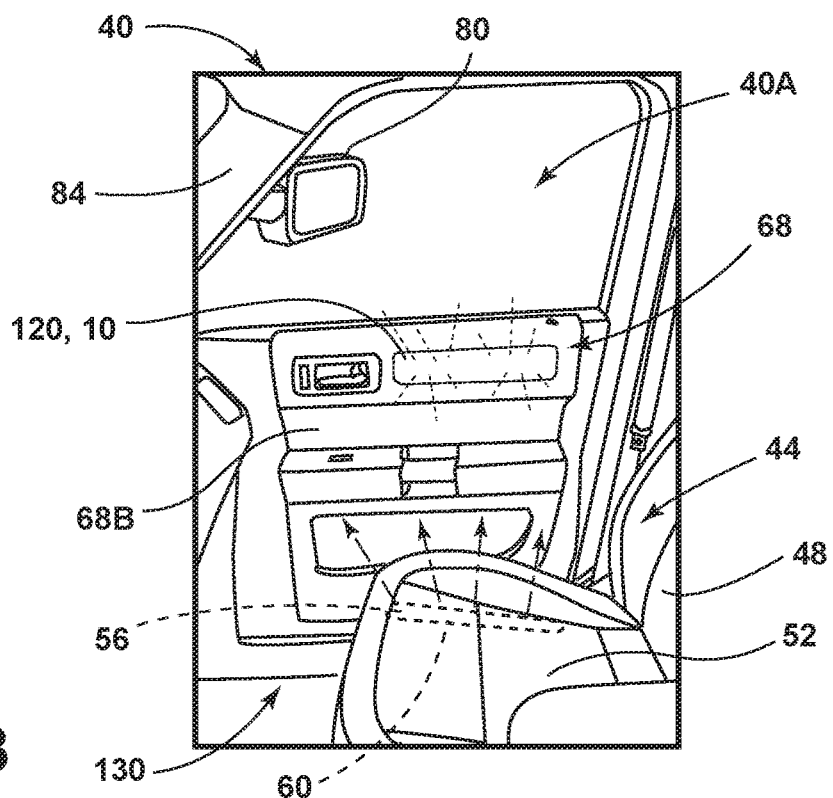
FIG. 3 is a perspective view of a vehicle interior, according to at least one example.

Referring now to FIG. 3, a door open indicator 120 is positioned on an interior surface 68B of the door 68. In the depicted example, the door open indicator 120 is shown as extending across the interior surface 68B of the door 68, but it will be understood that the door open indicator 120 may extend across only a portion of the interior surface 68B. The door open indicator 120 may be positioned at a bottom, middle or top of the door 68 or any location therebetween. It will be understood that the door open indicator 120 may be positioned on other doors 68 without departing from the teachings provided herein. The door open indicator 120 is depicted as a single, unitary, structure, but it will be understood that the door open indicator 120 may be composed of a plurality of smaller markers, each of the same, or varying, size. According to at least one example, the door open indicator 120 may be painted onto the interior surface 68B of the door 68. According yet other examples, the door open indicator 120 may be part of a sticker which is adhered to the interior surface 68B of the door 68.

According to various examples, the door open indicator 120 may include the photoluminescent structure 10. As such, illumination of the door open indicator 120 may excite the indicator 120 into emitting visible light. The illumination of the door open indicator 120 may further function to charge (e.g., in persistent phosphor examples) the door open indicator 120 such that the indicator 120 emits light over a sustained period of time without constant and/or continual illumination. It will be understood that the door open indicator 120 may be charged, or caused to emit light, from ambient lighting (e.g., the sun, moon, street lamps, etc.), illumination (e.g., head lights) from other vehicles and/or from the interior side marker 56. The door open indicator 120 may be charged while door 68 is in the open position and/or even while the door 68 is removed from the vehicle 40. The door open indicator 120 may be charged by the light assembly 60 in examples where the light assembly 60 is positioned on the side mirror 80 and/or within or proximate the interior side marker 56. The door open indicator 120 may include one or a plurality of reflective elements which may reflect visible and/or nonvisible light which may increase visibility of the vehicle 40 while the door 68 is in the open position.

The door open indicator 120 is configured to emit light outwardly and rearwardly from the vehicle 40. The light emitted from the door open indicator 120 may be a variety of colors based on the charging or excitation light 24 received (e.g., from the light assembly 60 and/or other sources). For example, the door open indicator 120 may be configured to glow, or emit, a red or white color. In another example, the door open indicator 120 may be configured to emit a colored light while the vehicle 40 is not in motion (e.g., parked). Further, the light emitted from the door open indicator 120 may take a variety of other colors which may provide an aesthetically pleasing appearance to the vehicle 40 (e.g., based on predefined user preferences or color schemes of the vehicle 40).

Use of the door open indicator 120 may be advantageous in increasing a visibility of the vehicle 40 under low lighting conditions. Further, the door open indicator 120 may provide a large and illuminated area allowing passing vehicles to quickly identify that the door 68 of the vehicle 40 is in the open position. For example, illumination of the door open indicator 120 may not only cause the indicator 120 to immediately emit light, but may also charge the indicator 120 to sustain a desired luminance for an extended period of time. Further, incorporation of one or more reflective elements into the door open indicator 120 may provide a passive illumination which may increase the visibility of the open door 68 of the vehicle 40.

Still referring to FIG. 3, the interior side marker 56 may be configured to provide a wash light or to emit light toward the interior surface 68B of the door 68. For example, the interior side marker 56 may be configured to be activated to emit light in a generally upward direction while the door 68 is in the closed position such that the interior side marker 56 provides ambient light to the door 68 as well as the interior 40A of the vehicle 40. As explained above, the light emitted from the interior side marker 56 may further be configured to excite, charge and/or illuminate the door open indicator 120 (e.g., in either the open or closed positions of the door 68). Such a feature may be advantageous in illuminating and/or charging the door open indicator 120 for the uses disclosed above.

Figure 4:
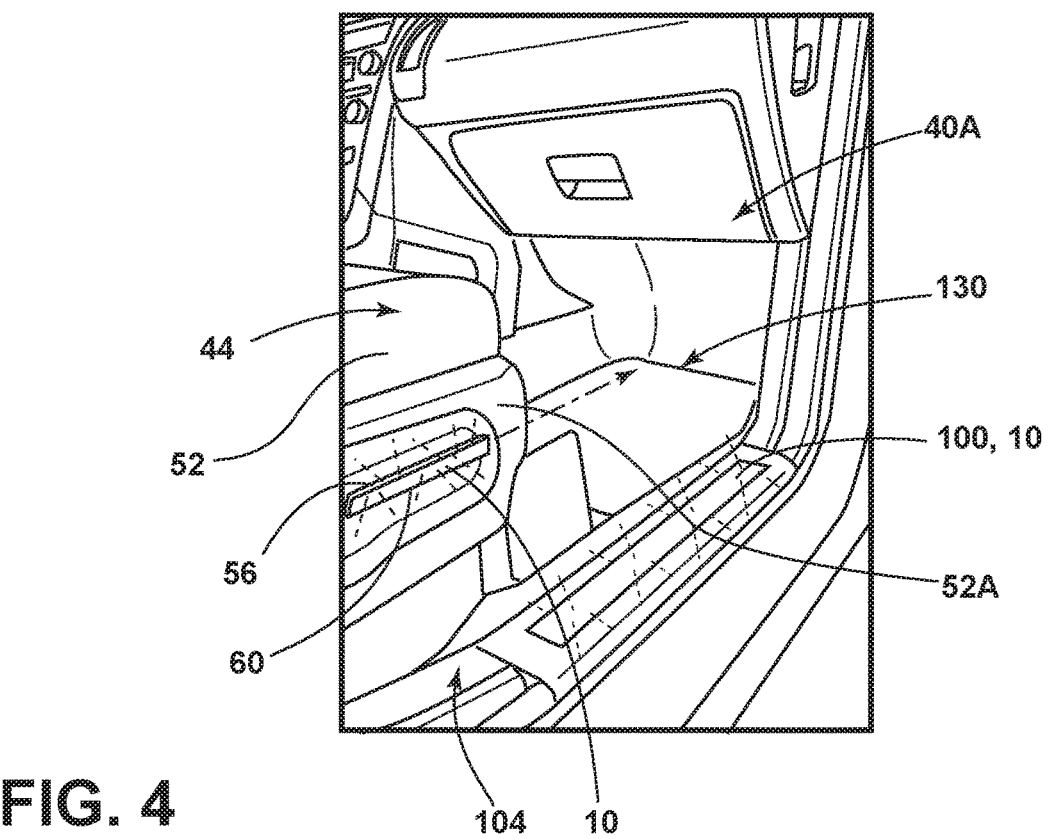
FIG. 4 is a perspective view of a vehicle interior, according to at least one example.

Referring now to FIGS. 4 and 5, the interior side marker 56 may be configured to emit light into a foot well 130 of the vehicle 40. The interior side marker 56 may emit light into the foot well 130 in a variety of manners. For example, the side marker 56 may include one or more optics, as explained in greater detail below, configured to direct light into the foot well 130. In examples where the interior side marker 56 includes the light assembly 60, the light assembly 60 may include an additional light source which may be used solely for illuminating the foot well 130 or may be used in conjunction with the light sources for illuminating the interior side marker 56. Additionally or alternatively to the above noted examples, the interior side marker 56 may wrap around to a vehicle forward surface of the seat base 52. It will be understood that the interior side marker 56 may be independently controlled to illuminate the foot well 130 and/or emit light in a direction outward from the vehicle 40.

Figure 6B:
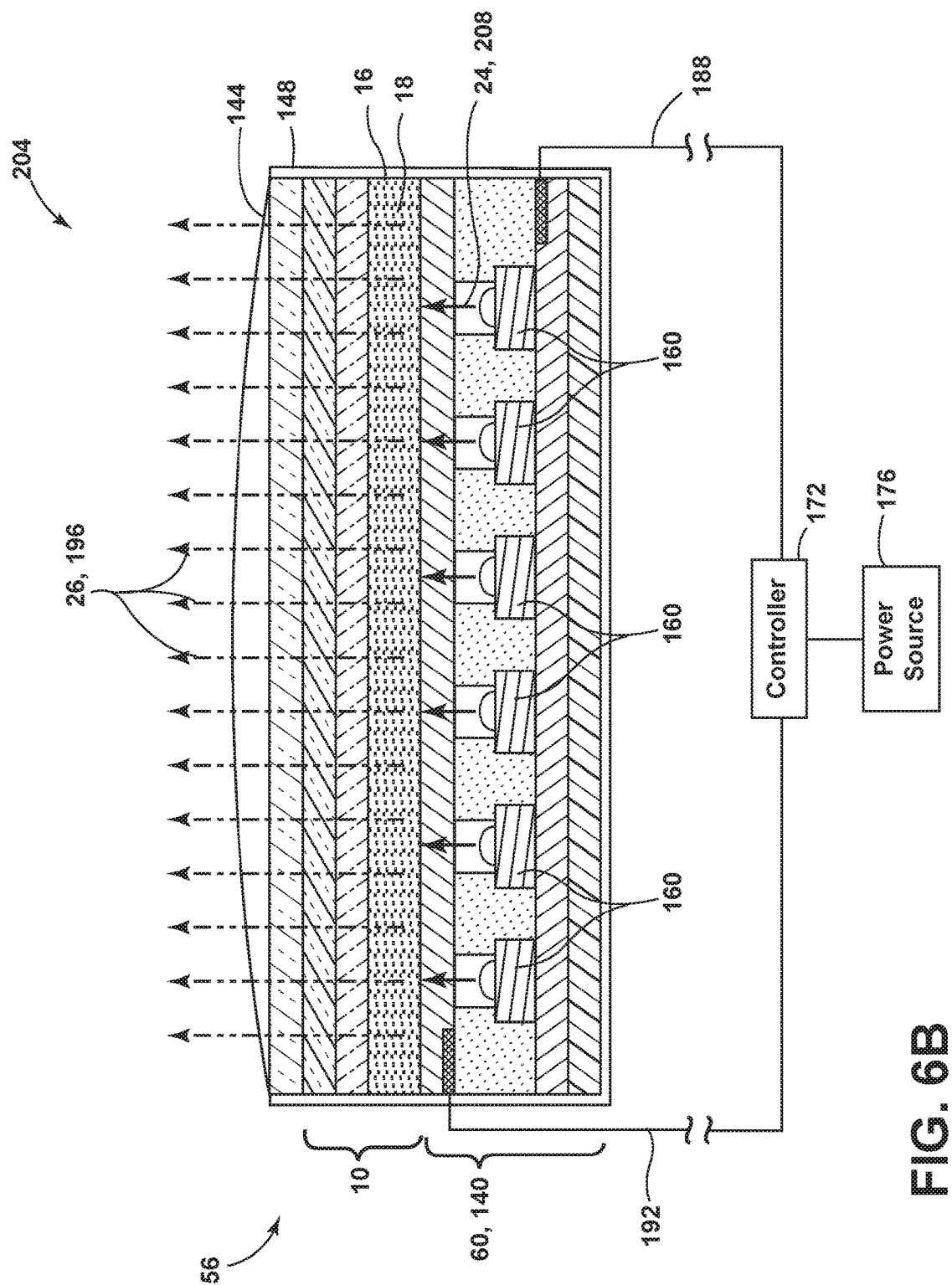
FIG. 6B is a cross-sectional view taken along line VI-VIB of FIG. 5 further illustrating the light assembly, according to one embodiment.

Referring to FIGS. 6A-6E, a cross-sectional view of the interior side marker 56 is shown, according to various embodiments. It will be understood that the disclosure provided below may equally be applied to the auxiliary side marker 100 and/or the door open indicator 120 without departing from the teachings provided herein. As illustrated in FIG. 6A, the interior side marker 56 may have a stacked arrangement that includes a light-producing assembly 140, the photoluminescent structure 10, a viewable portion 144, and an overmold material 148. It will be understood that the viewable portion 144 and the overmold material 148 may be two separate components, or may be integrally formed as a single component. Further, it will be understood that the light producing assembly 140 may be the same structure as the light assembly 60.

Referring now to FIG. 6A, the light-producing assembly 140 may correspond to a thin-film or printed light emitting diode (LED) assembly and includes a substrate 152 as its lowermost layer. The substrate 152 may include a polycarbonate, poly-methyl methacrylate (PMMA), or polyethylene terephthalate (PET) material on the order of 0.005 to 0.060 inches thick and is arranged over the intended vehicle substrate 152 on which the interior side marker 56 is to be received. Alternatively, as a cost saving measure, the substrate 152 may directly correspond to a preexisting structure.

The light-producing assembly 140 includes a positive electrode 156 arranged over the substrate 152. The positive electrode 156 includes a conductive epoxy such as, but not limited to, a silver-containing or copper-containing epoxy. The positive electrode 156 is electrically connected to at least a portion of a plurality of LED sources 160 arranged within a semiconductor ink 164 and applied over the positive electrode 156. Likewise, a negative electrode 168 is also electrically connected to at least a portion of the LED sources 160. The negative electrode 168 is arranged over the semiconductor ink 164 and includes a transparent or translucent conductive material such as, but not limited to, indium tin oxide. Additionally, each of the positive and negative electrodes 156, 168 are electrically connected to a controller 172 and a power source 176 via a corresponding bus bars 180, 184 and conductive leads 188, 192. The bus bars 180, 184 may be printed along opposite edges of the positive and negative electrodes 156, 168 and the points of connection between the bus bars 180, 184 and the conductive leads 188, 192 may be at opposite corners of each bus bar 180, 184 to promote uniform current distribution along the bus bars 180, 184. It should be appreciated that in alternate examples, the orientation of components within the light-producing assembly 140 may be altered without departing from the concepts of the present disclosure. For example, the negative electrode 156 may be disposed below the semiconductor ink 164 and the positive electrode 168 may be arranged over the aforementioned semiconductor ink 164. Likewise, additional components, such as the bus bars 180, 184, may also be placed in any orientation such that the light-producing assembly 140 may emit outputted light 196 (FIG. 6B) towards a desired location.

The LED sources 160 may be dispersed in a random or controlled fashion within the semiconductor ink 164 and may be configured to emit focused or non-focused light toward the photoluminescent structure 10. The LED sources 160 may correspond to micro-LEDs of gallium nitride elements on the order of about 5 to about 400 microns in size and the semiconductor ink 164 may include various binders and dielectric material including, but not limited to, one or more of gallium, indium, silicon carbide, phosphorous, and/or translucent polymeric binders.

The semiconductor ink 164 can be applied through various printing processes, including ink jet and silk screen processes to selected portion(s) of the positive electrode 156. More specifically, it is envisioned that the LED sources 160 are dispersed within the semiconductor ink 164, and shaped and sized such that a substantial quantity of the LED sources 160 align with the positive and negative electrodes 156, 168 during deposition of the semiconductor ink 164. The portion of the LED sources 160 that ultimately are electrically connected to the positive and negative electrodes 156, 168 may be illuminated by a combination of the bus bars 180, 184, controller 172, power source 176, and conductive leads 188, 192. According to one embodiment, the power source 176 may correspond to a vehicular power source 176 operating at 12 to 16 VDC. Additional information regarding the construction of light-producing assemblies 140 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 6A, the photoluminescent structure 10 is arranged over the negative electrode 168 as a coating, layer, film or other suitable deposition. With respect to the presently illustrated embodiment, the photoluminescent structure 10 may be arranged as a multi-layered structure including an energy conversion layer 16, optional stability layer 20, and optional protective layer 22, as described above.

The viewable portion 144 is arranged over the photoluminescent structure 10. In some embodiments, the viewable portion 144 may include a plastic, silicon, or urethane material and is molded over the photoluminescent structure 10 and light-producing assembly 140. Preferably, the viewable portion 144 should be at least partially light transmissible. In this manner, the viewable portion 144 will be illuminated by the photoluminescent structure 10 whenever an energy conversion process is underway. Additionally, by over-sealing the viewable portion 144, it may also function to protect the photoluminescent structure 10 and the light-producing assembly 140. The viewable portion 144 may be arranged in a planar shape and/or an arcuate shape to enhance its viewing potential. Like the photoluminescent structure 10 and the light-producing assembly 140, the viewable portion 144 may also benefit from a thin design, thereby helping to fit the interior side mirror 56 into small package spaces of the vehicle 40.

In some embodiments, a decorative layer 200 may be disposed between the viewable 144 and the photoluminescent structure 10. The decorative layer 200 may include a polymeric material or other suitable material and is configured to control or modify an appearance of the viewable portion 144. For example, the decorative layer 200 may be configured to confer an appearance of a trim component (e.g., metallic) to the viewable portion 144 when the viewable portion 144 is in an unilluminated state. In other embodiments, the decorative layer 200 may be tinted any color to complement the vehicle 40. In any event, the decorative layer 200 should be at least partially light transmissible such that the photoluminescent structure 10 is not prevented from illuminating the viewable portion 144 whenever an energy conversion process is underway.

The overmold material 148 is disposed around the light-producing assembly 140 and/or photoluminescent structure 10. The overmold material 148 may protect the light-producing assembly 140 from physical and chemical damage arising from environmental exposure. The overmold material 148 may have viscoelasticity (i.e., having both viscosity and elasticity), a low Young's modulus, and/or a high failure strain compared with other materials, so that the overmold material 148 may protect the light-producing assembly 140 when contact is made thereto. For example, the overmold material 148 may protect the light-producing assembly 140 from the environmental containments, such as dirt and water, that may come in contact with the vehicle 40. It is also contemplated that the viewable portion 144 may be formed by a portion of the overmold material 148.

In some embodiments, the photoluminescent structure 10 may be employed separate and away from the light-producing assembly 140. For example, the photoluminescent structure 10 may be positioned on the auxiliary side marker 100 and/or the door open indicator 120.

Referring now to FIG. 6B, an energy conversion process 204 for producing single color luminescence is illustrated, according to one embodiment. For purposes of illustration, the energy conversion process 204 is described below using the example of the interior side marker 56 depicted in FIG. 6A. In this embodiment, the energy conversion layer 16 of the photoluminescent structure 10 includes a single photoluminescent material 18, which is configured to convert inputted light 208 received from LED sources 160 into an outputted light 196 having a wavelength different than that associated with the inputted light 208. More specifically, the photoluminescent material 18 is formulated to have an absorption spectrum that includes the emission wavelength of the inputted light 208 (e.g., the excitation light 24) supplied from the LED sources 160. The photoluminescent material 18 is also formulated to have a Stokes shift resulting in the converted visible light 26 having an emission spectrum expressed in a desired color, which may vary per lighting application. The converted visible light 26 is outputted from the interior side marker 56 via the viewable portion 144, thereby causing the viewable portion 144 to illuminate in the desired color. The illumination provided by the viewable portion 144 may offer a unique, substantially uniform, and/or attractive viewing experience that may be difficult to duplicate through non-photoluminescent means.

Figure 6C:
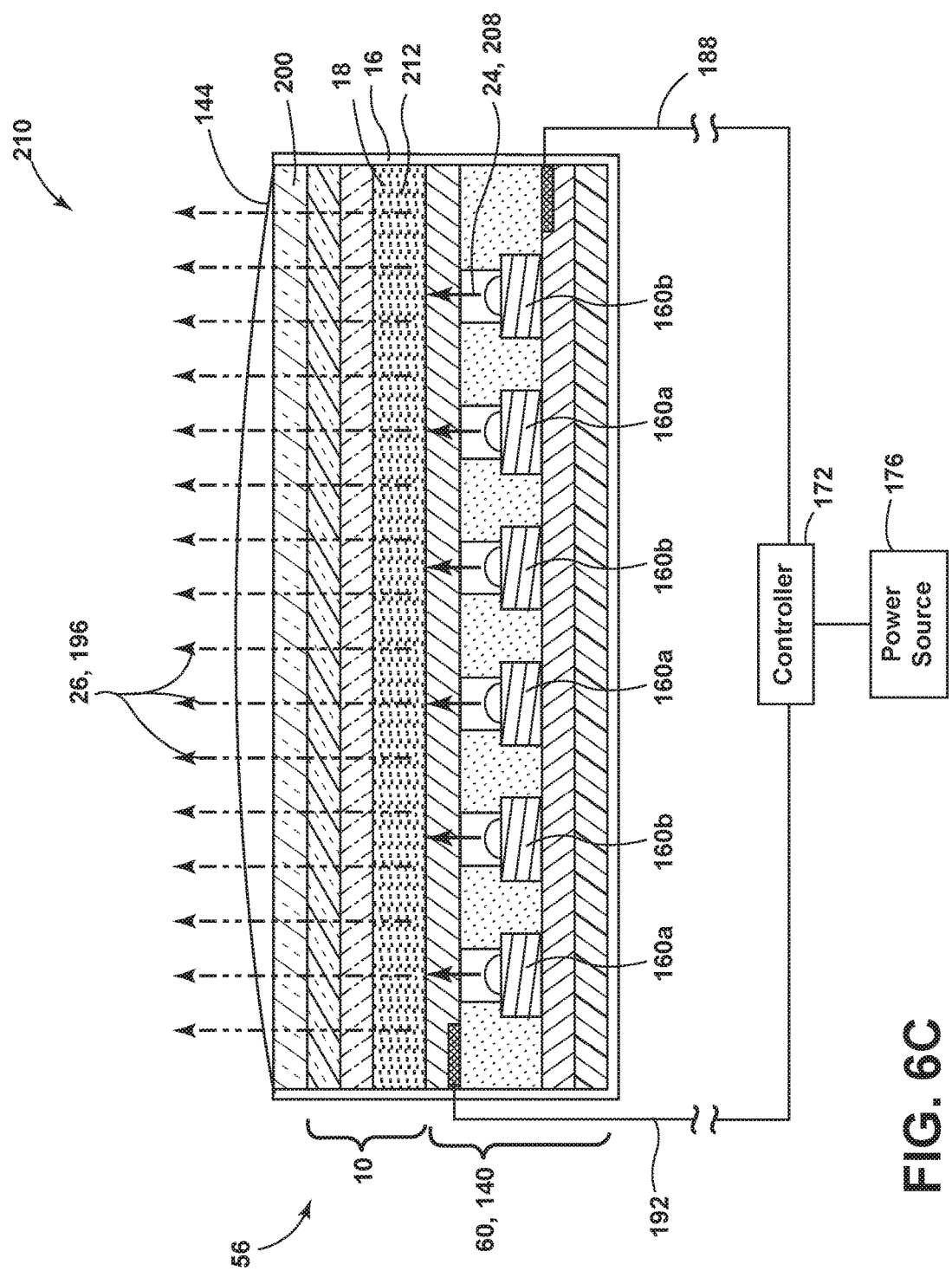
FIG. 6C is a cross-sectional view taken along line VI-VIC of FIG. 5 illustrating an alternate light assembly, according to one embodiment.

Referring to FIG. 6C, a second energy conversion process 210 for generating multiple colors of light is illustrated, according to one embodiment. For consistency, the second energy conversion process 208 is also described below using the interior side marker 56 depicted in FIG. 6A. In this embodiment, the energy conversion layer 16 includes the first and second photoluminescent materials 18, 212 that are interspersed within the energy conversion layer 16. Alternatively, the photoluminescent materials 18, 212 may be isolated from each other, if desired. Also, it should be appreciated that the energy conversion layer 16 may include more than two different photoluminescent materials 18 and 212, in which case, the teachings provided below similarly apply. In one embodiment, the second energy conversion process 204 occurs by way of down conversion using blue, violet, and/or UV light as the source of excitation.

With respect to the presently illustrated embodiment, the excitation of photoluminescent materials 18, 212 is mutually exclusive. That is, photoluminescent materials 18, 212 are formulated to have non-overlapping absorption spectrums and Stoke shifts that yield different emission spectrums. Also, in formulating the photoluminescent materials 18, 212, care should be taken in choosing the associated Stoke shifts such that the converted light 26 emitted from one of the photoluminescent materials 18, 212, does not excite the other, unless so desired. According to one exemplary embodiment, a first portion of the LED sources 160, exemplarily shown as LED sources 160a, is configured to emit an inputted light 208 having an emission wavelength that only excites photoluminescent material 18 and results in the inputted light 208 being converted into a visible light 26 of a first color (e.g., white). Likewise, a second portion of the LED sources 160, exemplarily shown as LED sources 160b, is configured to emit an inputted light 208 having an emission wavelength that only excites second photoluminescent material 212 and results in the inputted light 208 being converted into a visible light 26 of a second color (e.g., red). Preferably, the first and second colors are visually distinguishable from one another. In this manner, LED sources 160a and 160b may be selectively activated using the controller 172 to cause the photoluminescent structure 10 to luminesce in a variety of colors. For example, the controller 172 may activate only LED sources 160a to exclusively excite photoluminescent material 18, resulting in the viewable portion 144 illuminating in the first color. Alternatively, the controller 172 may activate only LED sources 160b to exclusively excite the second photoluminescent material 212, resulting in the viewable portion 144 illuminating in the second color.

Alternatively still, the controller 172 may activate LED sources 160a and 160b in concert, which causes both of the photoluminescent materials 18, 212 to become excited, resulting in the viewable portion 144 illuminating in a third color, which is a color mixture of the first and second colors (e.g., pinkish). The intensities of the inputted light 208 emitted from each of the LED sources 160a and 160b may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 160.

Figure 6D:
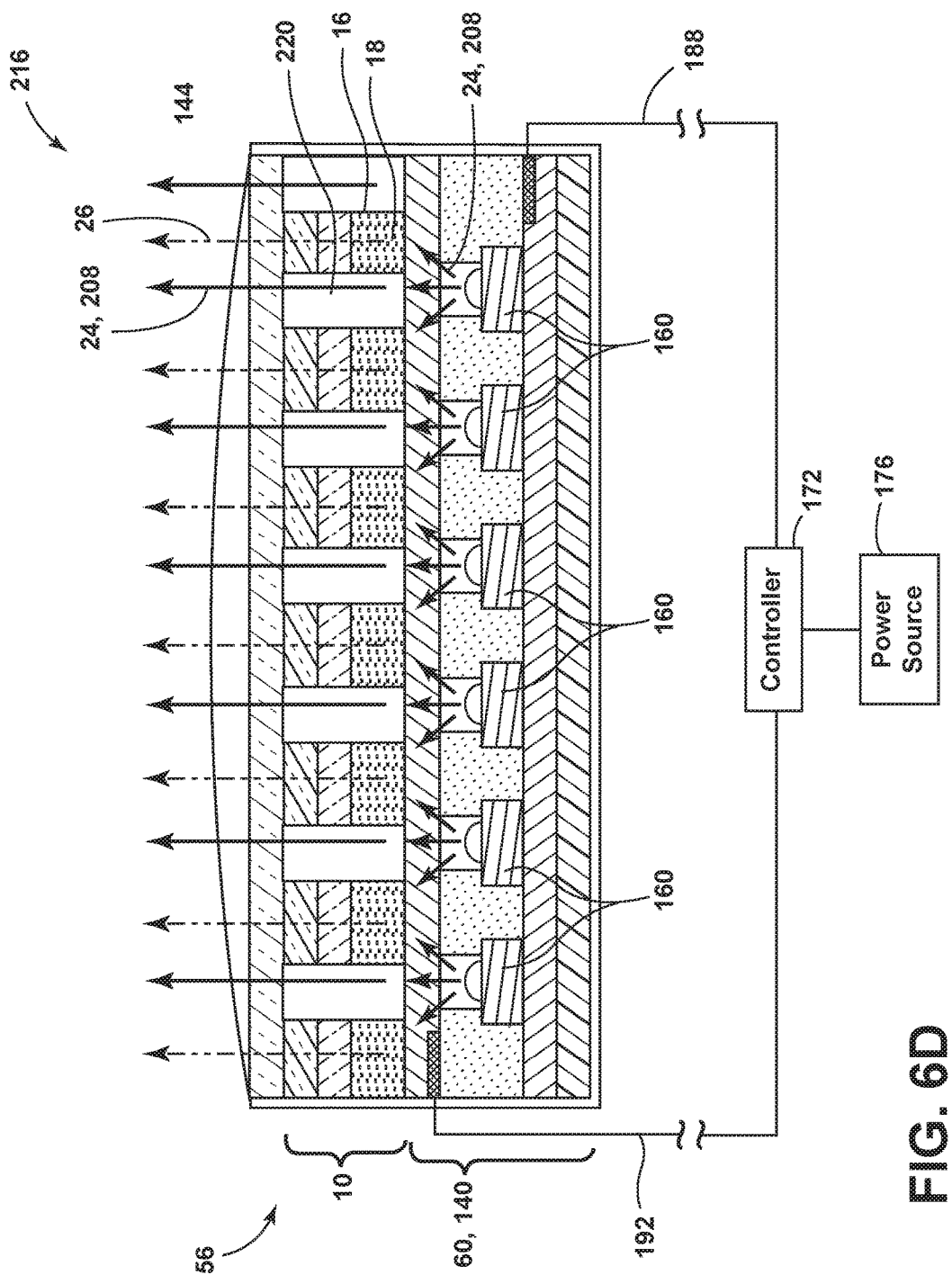
FIG. 6D is a cross-sectional view taken along line VI-VID of FIG. 5 illustrating a light assembly having a luminescent structure separated by light transmissive portions disposed on the light source, according to another embodiment.

Referring to FIG. 6D, a third energy conversion process 216 includes the light-producing assembly 140, such as the one described in reference to FIG. 6A, and the photoluminescent structure 10 disposed thereon, according to an alternate embodiment. The photoluminescent structure 10 is configured to convert inputted light 208 received from LED sources 160 into a visible light 26 having a wavelength different than that associated with the inputted light 208. More specifically, the photoluminescent structure 10 is formulated to have an absorption spectrum that includes the emission wavelength of the inputted light 208 supplied from the LED sources 160. The photoluminescent material 18 is also formulated to have a Stokes shift resulting in the converted visible light 26 having an emission spectrum expressed in a desired color, which may vary per lighting application.

The photoluminescent structure 10 may be applied to a portion of the light-producing assembly 140, for example, in a stripped manner. Between the photoluminescent structures 10 may be light transmissive portions 220 that allow inputted light 208 emitted from the LED sources 160 to pass therethrough at the first wavelength. The light transmissive portions 220 may be an open space, or may be a transparent or translucent material. The light 208 emitted through the light transmissive portions 220 may be directed from the light-producing assembly 140 towards a second photoluminescent structure (e.g., the auxiliary side marker 100) disposed proximate to the light-producing assembly 140. The second photoluminescent structure may be configured to luminesce in response to the inputted light 208 that is directed through the light transmissive portions 220.

Figure 6E:
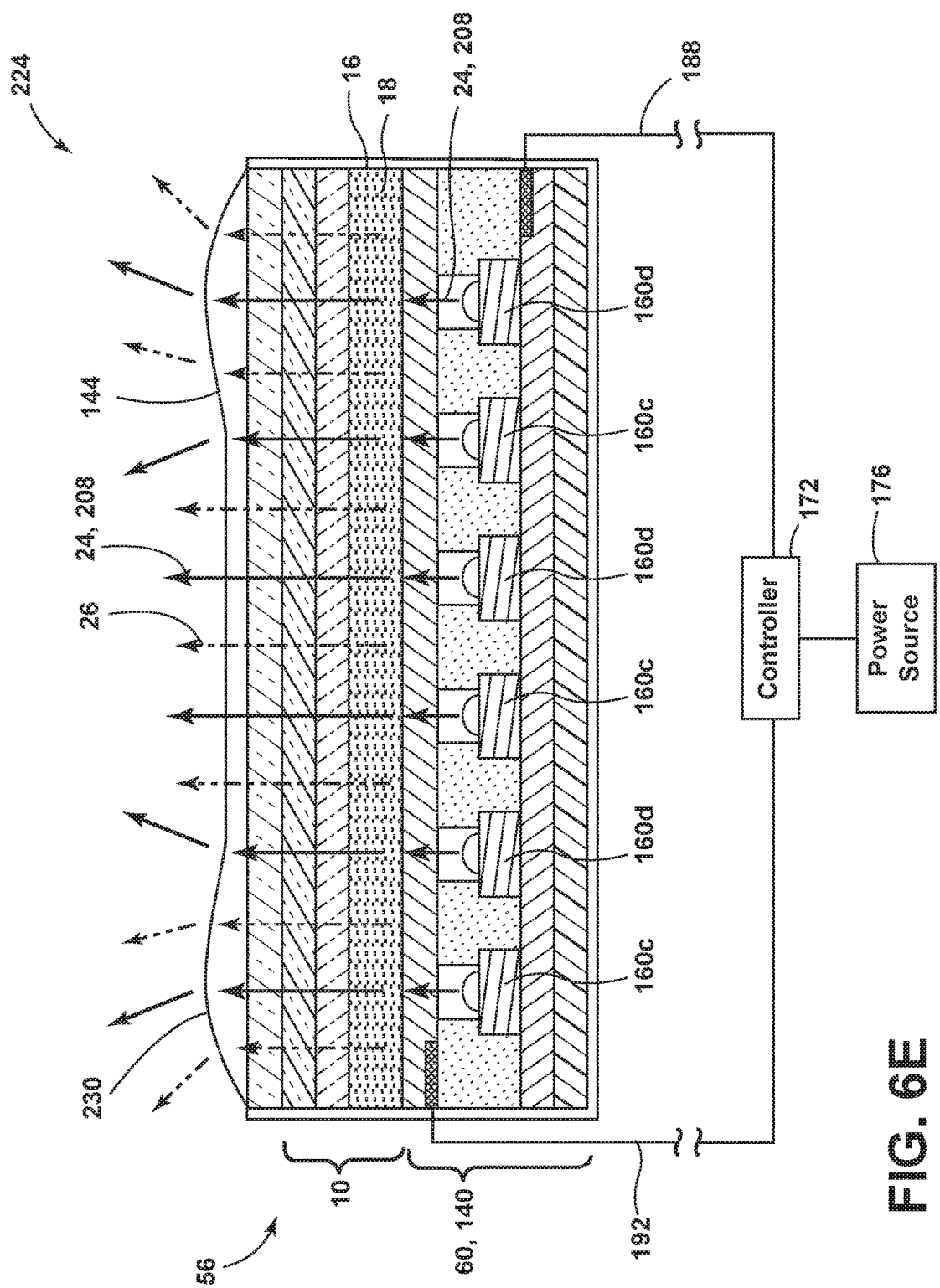
FIG. 6E is a cross-sectional view taken along line VI-VID of FIG. 5 illustrating an alternate light source having a luminescent structure disposed on the light source configured to convert a portion of light emitted from the light source from a first wavelength to a second wavelength, according to one embodiment.

Referring to FIG. 6E, a fourth energy conversion process 224 for generating multiple colors of light utilizing the light-producing assembly 140, such as the one described in reference to FIG. 6A, and a photoluminescent structure 10 disposed thereon is illustrated. In this embodiment, the photoluminescent structure 10 is disposed over a top portion of the light-producing assembly 140. The excitation of photoluminescent material 18 is formulated such that a portion of inputted light 208 emitted from LED sources 160c, 160d passes through the photoluminescent structure 10 at the first wavelength (i.e., the inputted light 208 emitted from the light-producing assembly 140 is not converted by the photoluminescent structure 10). The intensity of the emitted light (i.e., the combination of the inputted light 208 and outputted light 26) may be modified by pulse-width modulation or current control to vary the amount of inputted light 208 emitted from the LED sources 160c, 160d that pass through the photoluminescent structure 10 without converting to a second, outputted 26 wavelength. For example, if the light-producing assembly 140 is configured to emit light 26 at a low level, substantially, all of the light 208 may be converted to outputted light 26. In this configuration, a color of light 26 corresponding to the photoluminescent structure 10 may be emitted from the light-producing assembly 140. If the light-producing assembly 140 is configured to emit inputted light 208 at a high level, only a portion of the first wavelength may be converted by the photoluminescent structure 10. In this configuration, a first portion of the emitted light may be converted by the photoluminescent structure 10 and a second portion of the emitted light may be emitted from the light-producing assembly 140 at the first wavelength towards additional photoluminescent structures (e.g., the auxiliary side marker 100 and/or door open indicator 120) disposed proximately to the interior side marker 56. The additional photoluminescent structures may luminesce in response to the light 208 emitted from the light assembly 22.

According to one exemplary embodiment, a first portion of the LED sources 160, exemplarily shown as LED sources 160c, is configured to emit an inputted light 208 having a wavelength that excites the photoluminescent material 18 within the photoluminescent structure 10 and results in the inputted light 208 being converted into a visible light 26 of a first color (e.g., white). Likewise, a second portion of the LED sources 160, exemplarily shown as LED sources 160d, are configured to emit an inputted light 208 having a wavelength that passes through the photoluminescent structure 10 and excites additional photoluminescent structures disposed proximately to the side marker 56.

The interior side marker 56 may also include optics 230 that are configured to direct light 208 emitted from the LED sources 160c, 160d and the light 26 emitted from the photoluminescent structure 10 towards pre-defined locations (e.g., the foot well 130). For example, emitted light 208 from the LED sources 160c, 160d and the photoluminescent structure 10 may be directed and/or focused towards the foot well 130, door open indicator 120 and/or auxiliary side marker 100. Further, by different portions of the interior side marker 56 may be activated to illuminate different location in the vehicle 40.

Figure 7:
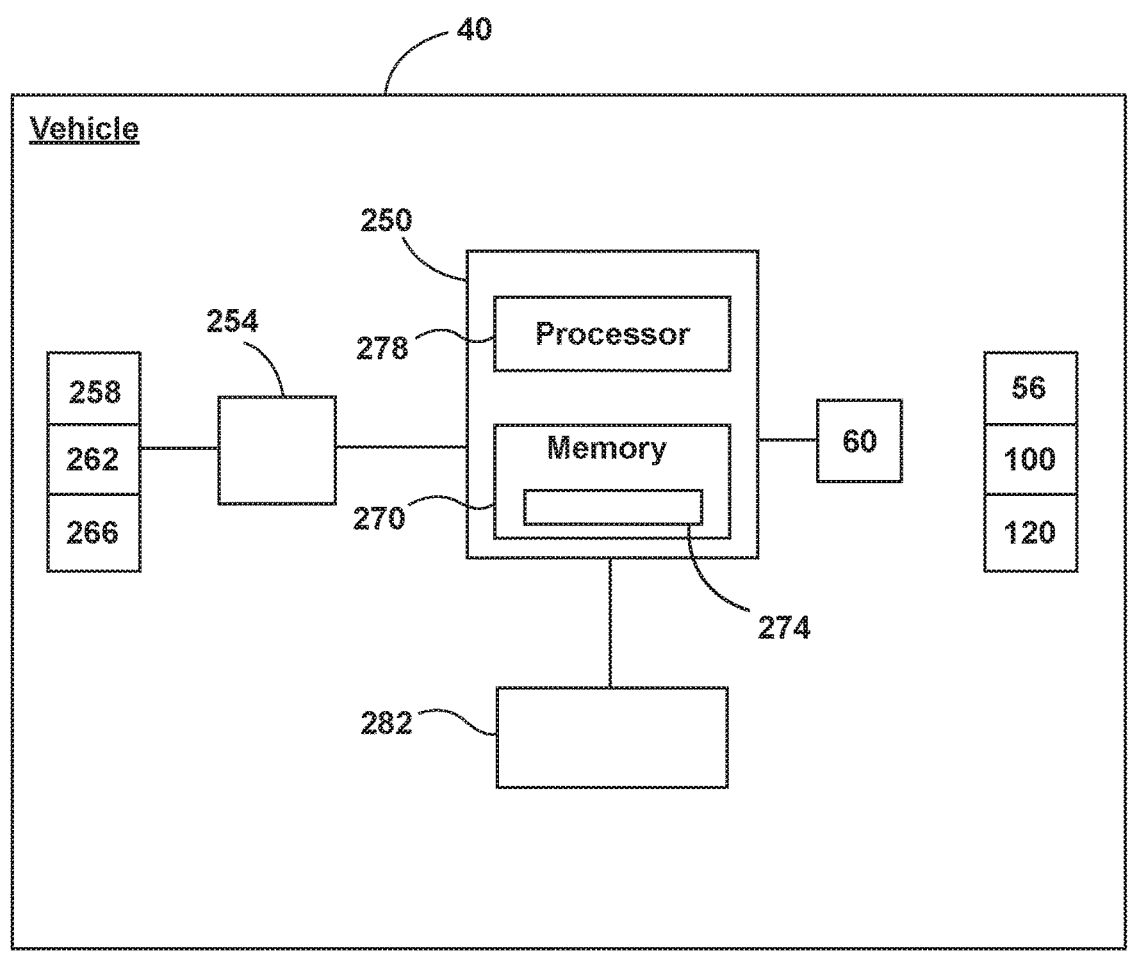
FIG. 7 is a block diagram of the vehicle and the lighting system.

Referring now to FIG. 7, depicted is a block diagram of the vehicle 40 in which the light assembly 60 is implemented. The vehicle 40 includes a controller 250 in communication with one or more vehicle control modules 254. The vehicle control module 254 may be configured to relay information to the controller 250 from a variety of sensors. Exemplary sensors include a light sensor 258, an ambient light sensor 262 (e.g., a day/night sensor) and a hinge sensor 266. The light sensor 258 may be positioned within the A-pillar 84 (FIG. 2A) and configured to detect light emitted from at least one of the interior side marker 56, the door indicator 120, auxiliary and/or side marker 100. It will be understood that although described in connection with a single light 258, the vehicle 40 may include a plurality of light sensors 258, each configured to detect a luminance value for a different region (e.g., interior side marker 56, auxiliary side marker 100 and/or door open indicator 120) of the vehicle 40. The hinge sensor 206 may be configured to detect a hinge status (e.g., whether the door 68 is engaged or not engaged and/or in the open or closed position) of the vehicle 40 (e.g., indicating the doors on or doors off status of the vehicle 40). Additionally or alternatively to the hinge sensor 206, the presence or position of the door 68 may be determined based on a "roll call" to linear interconnect network modules in the door 68 (e.g., window switches and/or door lock switches).

The controller 250 may include a memory 270 having a light control routine 274 contained therein that is executed by a processor 278 of the controller 250. The controller 250 may provide electrical power to the lighting assembly 60 via a power source 282 located onboard the vehicle 40. In addition, the controller 250 may be configured to control the light emitted from the lighting assembly 60 based on feedback received from the vehicle control module 254. The light control routine 274 may include a variety of routines configured to cause the controller 250 to vary the intensity, on/off status and/or color of the light emitted from the light assembly 60.

In a first example, the light control routine 274 of the controller 250 may be configured to utilize input data from the ambient light sensor 262 to provide the puddle lamp 86. It will be understood that additionally or alternatively, the puddle lamp 86 may be activated based on user preference (e.g., a switch) and/or other inputs. The puddle lamp 86 may be activated when the vehicle 40 detects (e.g., ultrasonic, Bluetooth, etc.) the approach of a user of the vehicle 40 and/or when the controller 250 anticipates (e.g., via hinge status) that an occupant of the vehicle 40 is about to exit the vehicle 40. In other words, the puddle lamp 86 may be activated in conjunction with a "welcome" or "farewell" light routine of the vehicle 40.

In a second example, the light control routine 274 may control the light assembly 60 to illuminate the interior side marker 56 and/or auxiliary side marker 100 when the controller 170 detects that the vehicle 40 is in the doors off configuration (e.g., through the hinge sensor 266). It will be understood that the activation of the light assembly 60 to illuminate the interior side marker 56, the door open indicator 120 and/or the auxiliary side marker 100 may additionally be based on input from the ambient light sensor 262 (i.e., indicating night time and that the interior side markers 56, 100 and the indicator 120 should be illuminated for greater visibility).

In a third example, the light control routine 274 may control the light assembly 60 to illuminate the door indicator 120 when the controller 250 detects that the door 68 is in the open position. Illumination of the door indicator 120, while the door 68 is in the open position, may be advantageous in alerting other vehicles to the open position of the door 68 which may increase safety of the vehicle 40. It will be understood that the interior side marker 56 and/or the auxiliary side marker 100 may be illuminated while the door indicator 120 is illuminated to increase visibility of the vehicle 40.

In a fourth example, the light sensor 258 may detect a luminance from the side markers 56, 100 and/or door indicator 120 and determine if the luminance value falls below a predefined threshold. In such an example, the light control routine 274 may be configured to pulse or flash the light assembly 60 to charge any of the side markers 56, 100 and/or door indicator 120 such that the luminance measured by the light sensor 258 meets or exceeds the predefined value.

In a sixth example, the light control routine 274 may be configured to flash or otherwise indicate to an occupant of the vehicle 40 that the door 68 has been removed and/or is not correctly attached as measured by the hinge sensor 266.

It will be understood that the light control routine 274 may perform any or all of the above noted examples, simultaneously or in sequence, without departing from the teachings provided herein.

Use of the present disclosure may offer a variety of advantages. First, as the side mirror 80 is coupled to the A-pillar 84, the mirror 88 and the light assembly 60 (i.e., in side mirror 80 examples) may remain in substantially the same position regardless of door position or door configuration of the vehicle 40. As the side mirror 80 and the light assembly 60 remain attached to the vehicle 40, the light assembly 60 may illuminate a plurality of locations (e.g., the interior side marker 56, auxiliary side marker 100, door open indicator 120) regardless of the doors on and doors off configuration of the vehicle 40 and/or open and closed position of the doors 68. Second, the interior side marker 56 may provide the puddle lamp 86 eliminating the need for a dedicated puddle light. Third, photoluminescent structure 10 examples of the side markers 56, 100 and/or door indicator 120 may allow the light assembly 60 to run for only a short period of time to illuminate (e.g., charge) the structures 10 thereby decreasing energy usage of the vehicle 40, but allowing a sustained illumination. Further, by using photoluminescent structures 10 in the side markers 56, 100 and/or door indicator 120, passive charging (e.g., which may reduce power consumption) from ambient light sources may be achieved. Fourth, use of the auxiliary side marker 100 may further allow a user of the vehicle 40 to enter and exit the vehicle 40 in a safe manner in low lighting conditions because the marker 100 illuminates at least a portion of the door sill 104. Fifth, use of the door indicator 120 may replace the use of traditional red passive reflectors attached to door 68. The light emitted from the door indicator 120 may provide enhanced visibility, and therefore safety, while the door 68 is in the open position.

According to various embodiments, a vehicle includes a seat assembly including a seatback and a seat base. A side marker is positioned on the seat base. A light assembly is configured to emit light toward the side marker. The side marker emits light to an exterior of the vehicle when the vehicle is in a doors off configuration. Embodiments of the vehicle can include any one or a combination of the following features:

the side marker includes a photoluminescent structure configured to be excited by the light from the light assembly;

the light assembly comprises a printed light source;

the light assembly is positioned between the side marker and the seat base;
the light assembly is positioned on a side mirror;
the side mirror is positioned on an A-pillar;
the side marker is positioned on an outboard surface of the seat assembly;
the side marker emits light into a foot well of the vehicle;
an auxiliary side marker is positioned on a door sill;
the side marker is configured to emit light onto the auxiliary side marker;
the photoluminescent structures include a phosphorescent material; and/or
the side marker is configured to emit light onto a door of the vehicle when the vehicle is in a doors on configuration.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Example embodiments include the following.

What is claimed is:

1. An illumination system for a vehicle, comprising:
a seat assembly comprising a seatback and a seat base;
a side marker positioned on the seat base; and
a light assembly separately disposed from the side marker and configured to emit light toward the side marker, wherein the side marker emits light to an exterior of the vehicle when the vehicle is in a doors off configuration.

2. The system of claim 1, wherein the side marker comprises a photoluminescent structure configured to be excited by the light from the light assembly.

3. The system of claim 1, wherein the light assembly comprises a printed light source.

4. The system of claim 1, wherein the light assembly is positioned between the side marker and the seat base.

5. The system of claim 1, wherein the light assembly is positioned on a side mirror.

6. The system of claim 5, wherein the side mirror is positioned on an A-pillar.

7. The system of claim 1, wherein the side marker is positioned on an outboard surface of the seat assembly.

8. The system of claim 1, wherein the side marker emits light into a foot well of the vehicle.

9. The system of claim 1, further comprising:
an auxiliary side marker positioned on a door sill.

10. The system of claim 9, wherein the side marker is configured to emit light onto the auxiliary side marker.

11. The system of claim 1, wherein the photoluminescent structures comprises a phosphorescent material.

12. The system of claim 1, wherein the side marker is configured to emit light onto a door of the vehicle when the vehicle is in a doors on configuration.

13. A vehicle, comprising:
a seat assembly comprising a seatback and a seat base; and
a side marker positioned on the seat base comprising:
a light assembly; and
a photoluminescent structure positioned on the light assembly, wherein the photoluminescent structure is configured to emit light into a foot well of the vehicle, further wherein the side marker is configured to charge a door indicator on a vehicle door.

14. The system of claim 13, wherein the side marker emits light to an exterior of the vehicle when the vehicle is in a doors off configuration.

15. The system of claim 13, wherein the light assembly comprises a printed light source.

16. The system of claim 15, wherein the light assembly is positioned between the side marker and the seat base.

17. A method of operating a vehicle, comprising:
removing a door of a vehicle such that the vehicle is in a doors off configuration;
charging a photoluminescent structure within a side marker positioned on a seat assembly from a separately disposed light assembly on the vehicle; and
emitting light from the side marker toward an exterior of the vehicle.

18. The method of claim 17, further comprising the step of:

emitting light from the side marker into a foot well of the vehicle.

19. The method of claim 17, further comprising the step of:
emitting a puddle lamp onto a ground beneath the vehicle from the side marker.

\* \* \* \* \*

UNITED STATES PATENT AND TRADEMARK OFFICE
CERTIFICATE OF CORRECTION

PATENT NO. : 9,758,090 B1
APPLICATION NO. : 15/449267
DATED : September 12, 2017
INVENTOR(S) : Salter et al.

Page 1 of 1

It is certified that error appears in the above-identified patent and that said Letters Patent is hereby corrected as shown below:

In the Claims

Column 20:
Claim 14, Line 51;
"system" should be --vehicle--.
Claim 15, Line 54;
"system" should be --vehicle--.
Claim 16, Line 56;
"system" should be --vehicle--.
Claim 16, Line 56;
"claim 15" should be --claim 13--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*